(12) United States Patent
Marshall

(10) Patent No.: US 6,704,985 B1
(45) Date of Patent: Mar. 16, 2004

(54) THREADED TOOL INSERT

(76) Inventor: James R. Marshall, 19 Marshall Rd., New Gloucester, ME (US) 04260

( * ) Notice: Subject to any disclaimer, the term of this patent is extended or adjusted under 35 U.S.C. 154(b) by 0 days.

(21) Appl. No.: 10/345,807

(22) Filed: Jan. 16, 2003

(51) Int. Cl.[7] .............................................. B23P 19/04
(52) U.S. Cl. ...................... 29/240.5; 29/240; 29/283.5
(58) Field of Search ............................... 29/240.5, 240, 29/283.5, 456, 509, 520, 293, 517; 81/10

(56) References Cited

U.S. PATENT DOCUMENTS

| | | | |
|---|---|---|---|
| 3,371,402 A | * | 3/1968 | Neuschotz ............. 29/243.517 |
| 3,388,621 A | * | 6/1968 | Neuschotz ................. 29/283.5 |
| 3,394,448 A | * | 7/1968 | Neuschotz ................. 29/281.3 |
| 3,750,259 A | * | 8/1973 | Timmons ................. 29/402.11 |
| 3,798,749 A | * | 3/1974 | Duer ........................... 29/520 |
| 3,813,183 A | | 5/1974 | Abernathy et al. |
| 3,956,787 A | | 5/1976 | Crumpacker |
| 4,077,101 A | | 3/1978 | Wallace |
| 4,172,314 A | | 10/1979 | Berecz et al. |
| 4,637,539 A | | 1/1987 | Turcott et al. |
| 4,649,727 A | * | 3/1987 | Gray .............................. 72/75 |
| 5,012,704 A | * | 5/1991 | Wing ........................... 81/59.1 |
| 5,025,542 A | | 6/1991 | Jacks |
| 5,025,556 A | | 6/1991 | Stafford |
| 5,212,865 A | | 5/1993 | Davis et al. |
| 5,281,059 A | | 1/1994 | Stuckle |
| 5,309,617 A | | 5/1994 | Dannar |
| 5,471,730 A | | 12/1995 | Sackett |
| 5,617,623 A | * | 4/1997 | Schron et al. ............. 29/283.5 |
| 5,771,856 A | | 6/1998 | Merchant |
| 5,803,676 A | | 9/1998 | Wienss |
| 6,000,114 A | * | 12/1999 | Newton et al. ............ 29/240.5 |
| 6,192,567 B1 | | 2/2001 | Newville |
| 6,321,433 B1 | | 11/2001 | Cliff et al. |
| 6,367,138 B1 | | 4/2002 | Newton et al. |

OTHER PUBLICATIONS

Walter Lubke Price List Showing Tool.
"Rock Solid Thrreaded Inserts," pp. 2–4, Showing Tools.

* cited by examiner

Primary Examiner—Joseph J. Hail, III
Assistant Examiner—Daniel Shanley
(74) Attorney, Agent, or Firm—Patricia M. Mathers; Thomas L. Bohan

(57) ABSTRACT

A single component tool for installing a threaded insert with locking keys in a tapped bore. The tool has no moving parts and enables simultaneous driving of the locking keys into the tapped bore, flush with the upper edge of the threaded insert in the tapped bore. The tool has a pilot that is inserted into the inner bore of the insert and a plurality of tool keyways for receiving the locking keyways of the insert. Bores are provided in one face of the tool for retaining and aligning the locking-keys while the keys are driven into the tapped bore. A timing mark provided on the tool aids in aligning the tool to simultaneously drive the locking keys flush with the upper edge of the threaded insert.

5 Claims, 3 Drawing Sheets

THREADED TOOL INSERT

BACKGROUND INFORMATION

1. Field of the Invention

The invention relates generally to the field of threaded fasteners. More particularly, the invention relates to a threaded insert for repairing threads in a bore. More particularly yet, the invention relates to a tool for installing a threaded insert with locking keys into a tapped bore.

2. Description of the Prior Art

Threaded inserts are commonly used to repair or strengthen tapped bores. For example, it is sometimes necessary to repair threads in a bore because the threads have become stripped or otherwise damaged. Thread repair generally comprises the steps of drilling out the damaged threads, tapping the bore to a larger diameter, and threading a threaded insert into the bore to provide an internal threaded diameter that will receive and securely hold the threaded fastener. Often, a threaded insert is used to strengthen a bore made of material that is otherwise too soft to securely hold a threaded fastener, particularly one that is repeatedly inserted and removed. In this case, a threaded insert of hardened material is inserted into a tapped bore of softer material to provide a rugged and durable threaded bore.

In order to install a threaded insert, the insert is properly aligned with the longitudinal axis of the tapped bore, screwed into the bore, and secured. One conventional method of securing the insert in the bore is to provide the threaded insert with locking keys. The conventional insert generally has two or four locking keys that extend upward from keyways that are evenly spaced around the outer perimeter of the insert. After the threaded insert has been threaded into the bore, the locking keys are driven down into keyways, forcing the keys to bite into material in the insert and in the bore, thereby securing the insert against radial movement. One common difficulty with installing the threaded insert is that the locking keys are relatively slender and are in danger of being bent, splayed, or damaged when the insert is screwed into the tapped bore.

Conventional tools for inserting threaded inserts generally comprise several components that move relative to one another and cooperate together to perform the various operations required to properly install the insert. Such a tool is disclosed by Schron et al. (U.S. Pat. No. 5,617,623; 1997). The tool has a drive means, a body, and a press. The body of the tool has a first end with an external threaded shaft onto which the drive means is threaded and a second end with an external threaded shaft onto which the press is threaded. A sleeve encircles the press and is movable relative to the press. A thrust bearing is assembled on the body above the press. The external threads on the threaded shaft on the second end mate with the internal threads on the repair insert, which is rotated down into the tapped bore until the locking keys on the insert hit against the impact face of the press. The drive means is a handle that is used to rotate the body to thread the insert into the tapped bore. The sleeve is moved longitudinally down toward the insert over the locking keys. The socket of a power tool is then placed on the drive means and a rotational force applied to the drive means, which drives the body, the press, and the insert rotationally, threading the insert into the tapped bore and then forcing the locking keys down into the keyways along the outer side of the insert.

The fact that the threaded insert tool of the type disclosed by Schron et al. is constructed of individual parts, some of which move relative to each other in the process of executing the task of inserting a threaded insert, is a disadvantage. The individual parts must be machined with a relatively high degree of precision to ensure that they will function properly together and they must be assembled. The required manufacturing and assembly processes increase the cost of producing such a tool. A tool that comprises multiple moving or cooperating parts also inherently provides sources of tool failure, the failures arising from worn parts that no longer function properly or contamination between parts that prevents them from moving or cooperating properly. As is generally known, threaded inserts are often used in an environment that is laden with contaminants, such as in a machine shop or a car repair shop, and care must be taken to keep the insert repair tool free of dirt and other contaminants.

A single-body insert tool, such as the tool distributed by the Christopher Company for installing ROCK SOLID INSERTS, eliminates some of the disadvantages of other conventional tools, in that it has no moving or cooperating parts. The tool is a cylindrical body with a strike end and an insertion end. A pilot extends from the insertion end for guiding the tool onto the threaded insert. Keyways are provided around the outer perimeter of the insertion end for receiving the locking keys of the threaded insert. A continuous circular groove, concentric to the pilot, is machined into the face of the insertion end. The threaded insert is placed over the pilot such that the locking keys of the threaded insert are secured in the tool keyways. The insert is screwed into the tapped bore, the insert tool lifted slightly and rotated about its longitudinal axis so that the upper ends of the locking keys slide into the groove. An impact force is applied to the strike end of the tool to drive the locking keys into the keyways provided on the threaded insert. Once the tool has been forced down onto the threaded insert as far as it can go, the tool is lifted from the insert. At this point, the upper ends of the locking keys protrude upward beyond the upper edge of the threaded insert. In order to drive the locking keys flush with the upper edge of the insert, the endface of the pilot is placed on a locking key and an impact force applied to the strike end of the tool. Typically, a threaded insert has four locking keys, and the step of driving the locking key flush with the upper edge of the insert is repeated for each locking key.

The disadvantage of the conventional single-body tool is that each locking key must be driven down into the tapped bore individually. This requires repetitive installation steps and also increases the risk that the person installing the insert will accidentally pinch or injure himself during the installation. A further disadvantage of this tool is that it does not correct for a misalignment of the locking key. A misaligned key makes it very difficult, if not impossible, to drive the key properly into the keyway on the insert in the tapped bore.

What is needed, therefore, is a threaded insert tool that provides a means of inserting a threaded insert with locking keys into a tapped bore while simultaneously protecting the locking keys. What is further needed is such a device that corrects a misalignment of the locking keys. What is yet further needed is such a device that simultaneously drives all the locking keys completely into the threaded insert.

BRIEF SUMMARY OF THE INVENTION

It is an object of the present invention to provide a threaded insert tool that properly aligns and inserts a threaded insert into a tapped bore, while simultaneously protecting the locking keys from damage. It is further an object to provide such a tool that corrects a misalignment of the locking keys. It is a yet further object to provide such a tool simultaneously drives all the locking keys completely into the threaded insert so that the upper ends of the keys are flush with the upper edge of the insert.

The objects are achieved by providing a single-component threaded insert tool. The threaded insert tool according to the invention comprises a body with an insertion end for threading the insert into a threaded bore and a strike end for receiving impact blows. The insertion end of the tool has an insertion face, tool keyways evenly spaced around the outer perimeter of the insertion end. A cylindrical pilot or guide extends from the insertion end, coaxial to the longitudinal axis of the tool, and guides the tool into the insert. Key-retaining means are provided on the insertion face. The tool keyways are adapted to receive and engage the locking keys of the insert when the insert is slipped over the pilot in preparation for installation. The key-retaining means may be an individual bore provided for each locking key or a partial circular groove that opens from each tool keyway. The key-retaining means according to the invention may also include an alignment means to re-align misaligned locking keys. In this case, the key-retaining means is provided with a contoured inner surface that urges the locking key into proper alignment when the insert tool is forced down against the locking keys during installation of the insert. A timing mark may be provided on the outer perimeter of the insert tool to aid in ensuring that a flat strike surface is provided above each of the locking keys for driving them simultaneously down into the insert. It is noted that the threaded insert tool according to the invention is dimensioned to receive and install a threaded insert of a particular size that has two or four locking keys. Thus, the outer diameter of the pilot corresponds to the inner thread diameter of the threaded insert, and the length of the pilot corresponds approximately to the length of the insert, and the outer diameter of the insertion face corresponds to the diameter of the upper face of the outer thread on the threaded insert.

Installation of a threaded insert using the threaded insert tool according to the invention is as follows: The threaded insert is placed on the pilot and moved toward the body of the tool so that the locking keys are received into the corresponding tool keyways. The threaded insert is then placed in the tapped bore and the tool rotated to screw the insert down into the tapped bore. The tool may be rotated manually or with a power tool.

Once the insert is threaded into the bore to the desired depth, the tool is lifted up from the insert until the locking keys are free of the tool keyways. The tool is then rotated slightly and lowered over the insert such that the upper end of each key is received into the corresponding key-retaining means. An impact force is applied to the strike end of the tool that is sufficient to drive the keys down along the sides of the threaded insert in the tapped bore. A hammer or other suitable tool is used to apply the impact force to the strike end. Once the face of the insertion end of the tool is flush with the upper surface of the threaded insert, the tool is lifted off the keys and rotated until the timing mark aligns with one of the keys. The insertion face now provides a flat strike surface above each of the locking keys. An impact force is again applied to the strike end of the tool with sufficient force to simultaneously drive the keys down into the bore until the upper ends of the keys are flush with the upper edge of the insert.

The device according to the invention is suitable for manual and automated insertion of threaded inserts. The body of the tool may be contoured to enable location of the tool within a jig in an automated manufacturing or assembly process. As mentioned above, a hammer or other suitable tool is used to strike the tool and thereby drive the keys down into the bore.

DETAILED DESCRIPTION OF THE INVENTION

Figure 1:
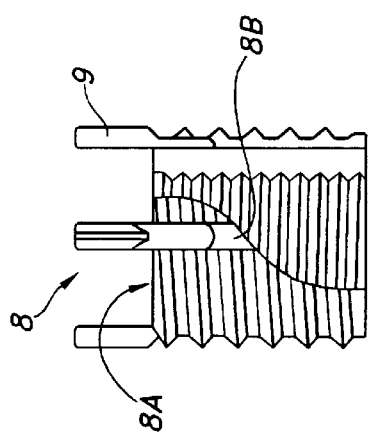
FIG. 1 is an illustration of a conventional threaded insert with locking keys (prior art).

FIG. 1 shows a conventional threaded insert 8. The particular embodiment shown has four locking keys 9 and insert keyways 8B; another conventional embodiment of the same type of threaded insert 8 has two locking keys 9.

Figure 3:
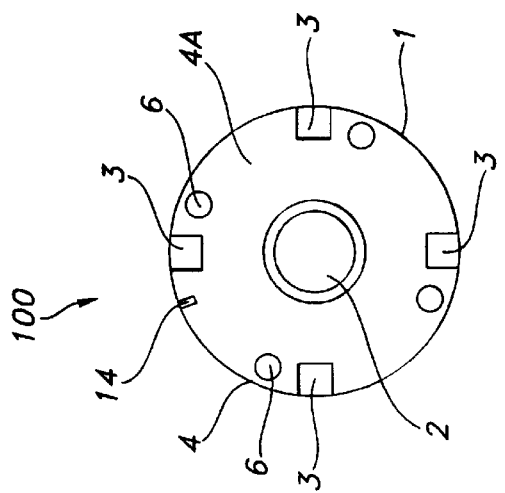
FIG. 3 is a plane view of the insertion end of the tool of FIG. 1, illustrating four keyways for receiving locking keys and four key-retaining alignment bores.
Figure 2:
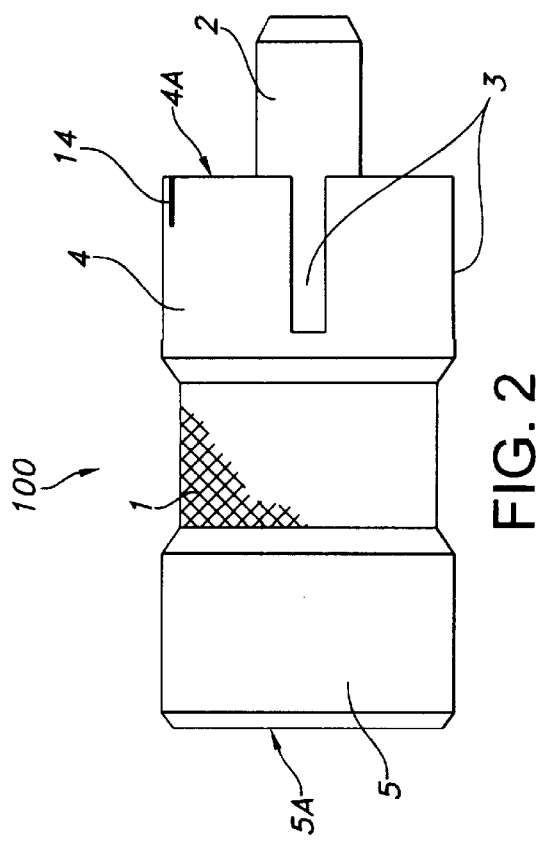
FIG. 2 is a side view of a first embodiment of the threaded insert tool according to the invention.
Figure 4:
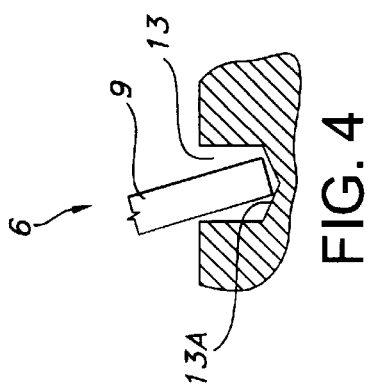
FIG. 4 is a detail illustration of the key-retaining alignment bore.

FIGS. 2 through 4 illustrate the preferred embodiment of a threaded insert tool 100 according to the invention that is used to install the threaded insert 8 into a threaded bore. As shown in FIG. 2, the tool 100 comprises a body 1, having an insertion end 4 with an insertion face 4A and a strike end 5. The insertion end 4 includes an insertion pilot 2 that extends outward from the insertion face 4A, coaxially to the longitudinal axis of the body 1. Tool keyways 3 are provided on the outer perimeter of the insertion end 4 and a timing mark 14, as shown.

In the embodiment shown, a knurled surface is indicated on the recessed portion of the body 1. This may be desirable for manual operation of the tool 100. Also, the embodiment of the tool 100 is shown as a substantially cylindrically-shaped tool. These features are not to be considered limitations on the invention. The outer shape of the body 1 of the threaded insert tool 100 according to the invention may have any suitable shape. Particularly when used in an automated process, it may be desirable that the body 1 of the threaded insert tool 100 be rectangular or octagonal in shape, or have a locating indentation. The preferred embodiment of the threaded insert tool 100 is made of surface-hardened steel. It shall be understood that any material that is suitable for the particular intended application of the tool may be used.

FIG. 3 shows the insertion face 4A and the pilot 2 of the insertion end 4, as well as the placement of four keyways 3, the timing mark 14, and four key-retaining means 6. The tool keyways 3 are spaced 90° apart from each other around the outer perimeter of the insertion end 4 and are dimensioned such that the locking keys 9 provided on the conventional threaded inserts 8 are receivable therein. In the embodiment shown, the key-retaining means 6 are shown to be individual depressions or bores, with each depression placed near a tool keyway 3. It is a matter of convenience and efficiency to place the depressions close to the tool keyways 3, as will become clear below in the description of the use of the tool 100. This is, however, not necessary. The primary purpose of the key-retaining means 6 is to receive the upper ends of the threaded-insert locking keys 9 so as to properly locate the tool 1 above the locking keys 9 and to protect the locking keys 9 while the threaded insert 8 is screwed down into the threaded bore. Thus, it is not necessary to have individual depressions as the key-retaining means 6, rather, the key-retaining means 6 may be configured as partial circular key-retaining slots or grooves that extend from the corresponding tool keyways 3, as will be discussed below with reference to FIG. 8.

In the preferred embodiment, the key-retaining means 6 is an alignment bore 13 that, in addition to properly locating the tool 1 on the threaded insert 8, also serves to correct a misalignment of one or more locking keys 9. FIG. 4 is an illustration of the alignment bore 13, showing a guide surface 13A in the bore 13 that serves to urge the locking key 9 into proper alignment.

Figure 5:
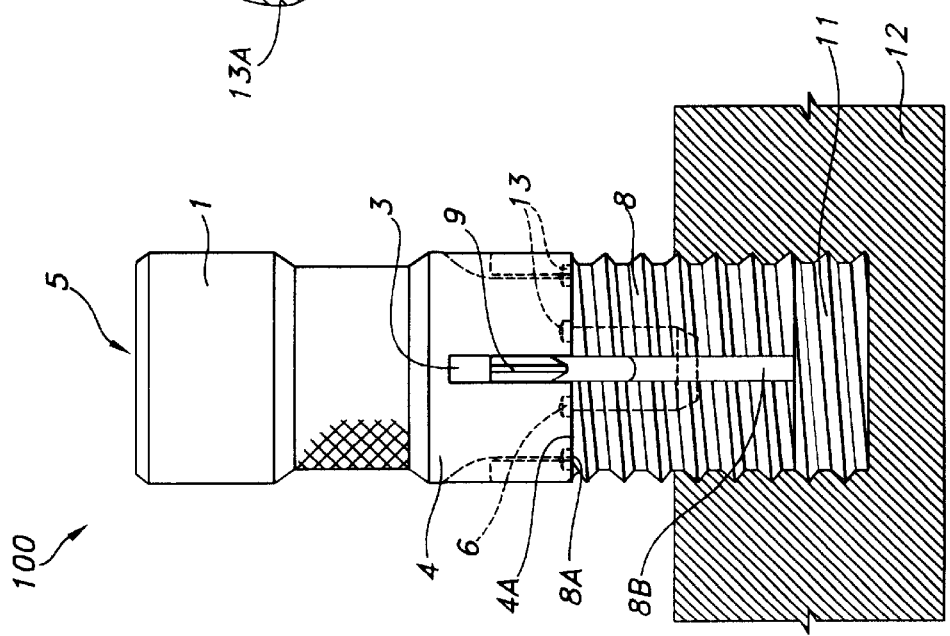
FIG. 5 is an elevational view of the tool of FIG. 2, illustrating the placement of a threaded insert on the pilot and insertion of the locking keys into the tool keyways.

FIG. 5 shows the threaded insert 8 partially screwed into a tapped bore 11 in a workpiece 12. The threaded insert 8 with locking keys 9 has been placed over the pilot 2 of the tool 100 so that an upper end 8A of the insert 8 abuts the insertion face 4A of the tool 100 and the locking keys 9 are received and engaged in the tool keyways 3.

Figure 6:
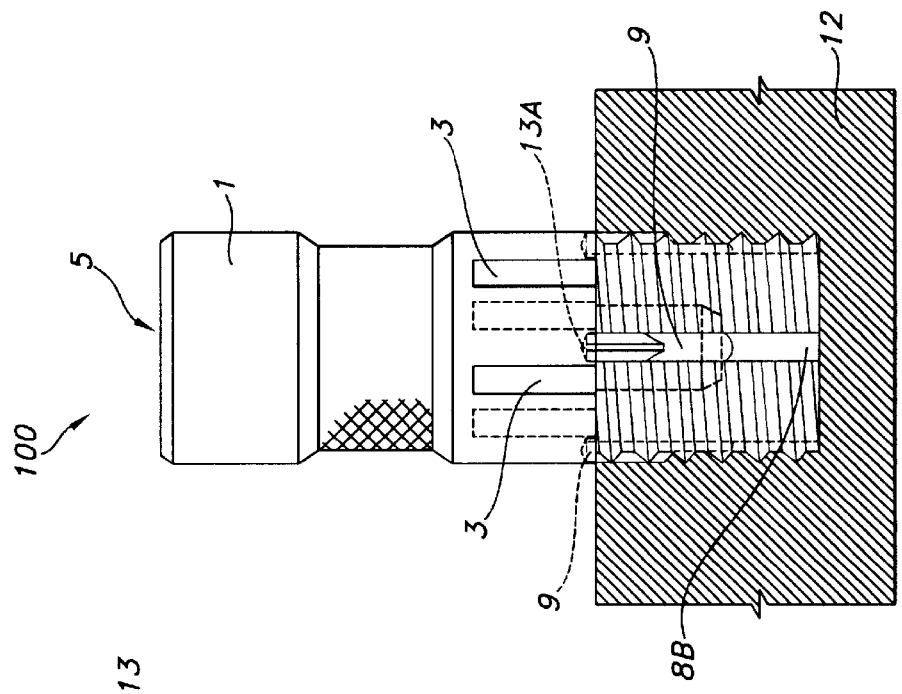
FIG. 6 is an elevational view of the tool of FIG. 5, showing the threaded insert threaded into the bore and the upper ends of the keys in the key-retaining alignment bores on the tool.

FIG. 6 shows the threaded insert 8 screwed completely down into the tapped bore 11 and with the locking keys 9 pounded down into the bore 11 in the insert keyways 8B provided in the insert 8. The upper ends of the locking keys 9 are protruding into the key-retaining alignment means 6 on the insertion end 4 of the tool 100. In the embodiment shown, the key-retaining alignment means 6 are the alignment bores 13.

Figure 7:
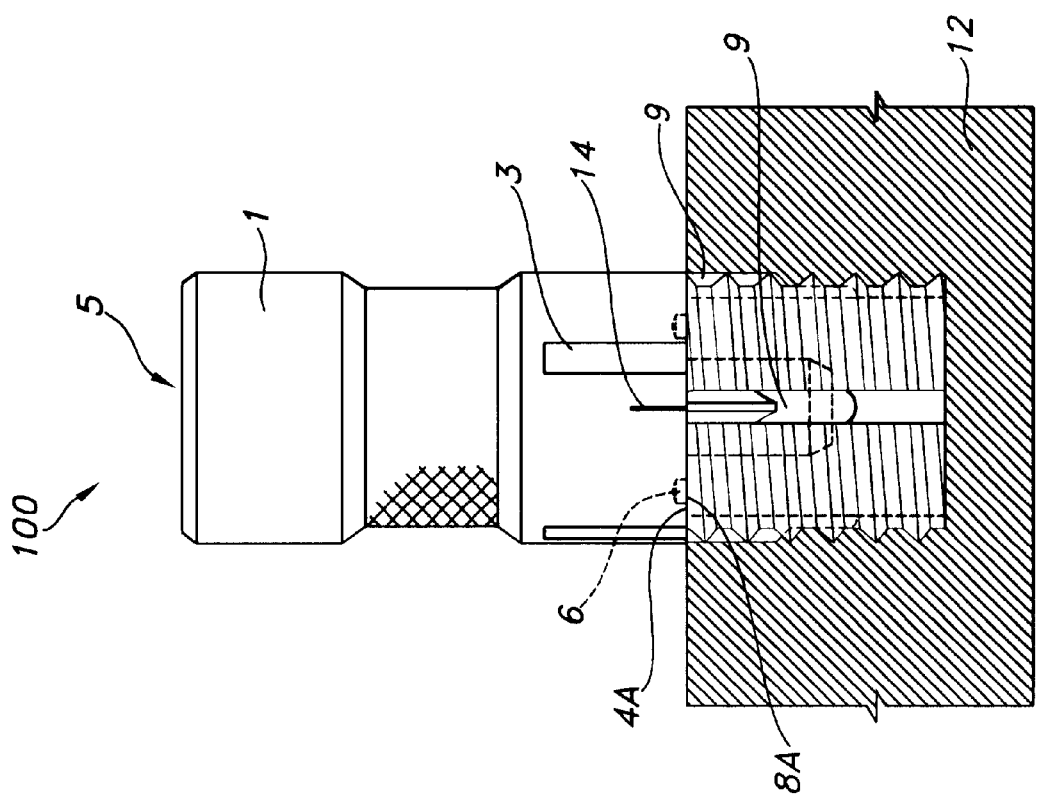
FIG. 7 is an elevational view of the tool of FIG. 5, showing the timing mark aligned with a locking key and the locking keys driven all the way into the tapped bore.

FIG. 7 shows the tool 100 rotated so that the timing mark 14 is aligned with one of the locking keys 9. The locking keys 9 have been driven down into the tapped bore 11 by applying an impact force to the strike end 5 of the tool 100 and have bitten into the threads in the bore 11, as shown at 11A.

Figure 8:
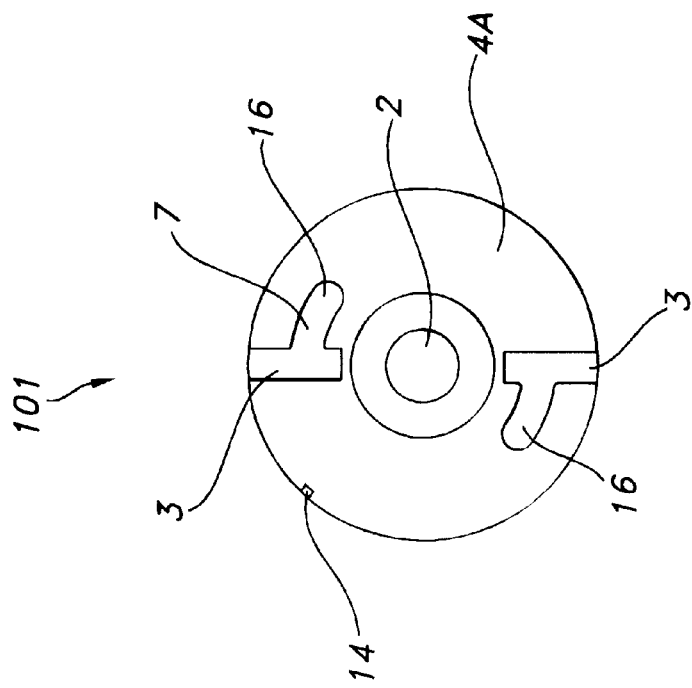
FIG. 8 is a plane view of the insertion end of a second embodiment of the threaded insert tool according to the invention, showing a partial circular groove that serves as a key-retaining alignment means.

FIG. 8 illustrates an alternative embodiment of the threaded insert tool 101 according to the invention. (All features of the tool 101 that are identical to those of tool 100 have the same reference designations.) The key-retaining means 6 is shown as a partial circular groove 16 on the insertion face 4A. The partial circular groove 16 opens from the tool keyway 3 such that the locking key 9 is receivable in the groove 16 when the tool 101 is rotated slightly. This illustration of the threaded insert tool 101 that is adapted to install a threaded insert 8 having only two locking keys 9 is for illustration purposes only. It should be understood that the key-retaining means 6 shown here is also applicable to an insert tool that is adapted to receive an insert 8 having four locking keys 9.

Figure 9:
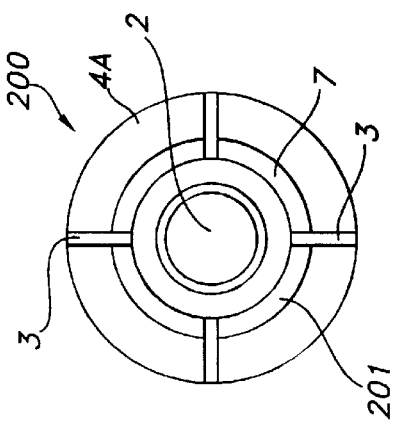
FIG. 9 is a plane view of the insertion end of a conventional threaded insert tool having a continuous circular groove that serves as a key-retaining means. (Prior Art)

FIG. 9 (prior art) shows a continuous groove 7 on the insertion face of a known tool 200. The diameter of the groove 7 is such that the two or four locking keys on the threaded insert 8 are receivable in the groove 7 when the tool 101 is lifted sufficiently to accommodate the length of locking keys 9 and rotated so that the locking keys 9 move into the groove 7. Because the continuous groove 7 forms a complete concentric circle, it is not possible to use the insertion face 4A of the tool 200 to drive the locking keys 9 into the bore 11, as is done with the preferred and the alternative embodiments of the threaded insert tool 100/101 according to the invention. Rather, the end face of the insertion pilot 2 is used as a punch to drive each locking key 9 individually into the bore 11.

The process of installing the threaded insert 8 with the tool 100 or 101 according to the invention is as follows. The threaded insert 8 is slid onto the pilot 2, moved toward the insertion face 4A of the tool 100,101, and simultaneously rotated as necessary until the locking keys 9 on the insert 8 are received in the corresponding tool keyways 3 on the body 1. The lower end of the threaded insert 8 is then inserted and screwed into the bore 11, as shown in FIG. 5, by rotating the body 1 of the tool 100,101 accordingly. The tool 100,101 is rotated until the insert 8 is completely threaded into the bore 11. The tool 100,101 is then lifted upward from the insert 8 until the locking keys 9 are released from the tool keyways 3. The body 1 is rotated and lowered toward the insert 8 so that the upper ends of the locking keys 9 are received into the key-retaining means 6 on the face 4A of the insertion end 4 of the tool 100,101. A suitable impact tool is now used to provide an impact force against the strike end 5 of the tool 1100,101 that is sufficient to drive the locking keys 9 down into the tapped bore 11. As the locking keys 9 are driven down into the bore 11, the insertion face 4A approaches the upper edge of the threaded insert 8. When the locking keys 9 cannot be forced any lower into the bore 11, the tool 100,101 is lifted from the insert 8 so that the locking keys 9 are no longer engaged in the tool keyways 3 and rotated until the timing mark 14 is aligned with one of the locking keys 9. The alignment of the timing mark 14 with the locking key 9 ensures that a flat face 4A on the insertion end of the tool 100,101 is provided above each one of the locking keys 9. Again, an impact force is applied to the strike end 5 of the tool 100,101, thereby forcing the upper ends of the locking keys 9 down into the bore until they are flush with the upper edge 8A of the threaded insert 8.

The embodiments of the invention mentioned herein are merely illustrative of the present invention. It should be understood that a person skilled in the art may contemplate many variations in construction of the present invention in view of the following claims without straying from the intended scope and field of the invention herein disclosed.

What is claimed is:

1. A device for installing a threaded insert with a plurality of locking keys into a tapped bore, said device comprising a single-component body having a longitudinal axis, an insertion end with an outer perimeter and an insertion face, a pilot, and a strike end with a strike face, wherein said pilot extends from said insertion face coaxial to said longitudinal axis, wherein a plurality of tool keyways are provided in said outer perimeter of said insertion end, parallel to said longitudinal axis, said plurality of tool keyways corresponding in number to said plurality of locking keys, each tool keyway of said plurality of tool keyways being adapted to receive a respective one of said locking keys, wherein a locking-key retention means and a finish-drive surface are provided on said insertion face, said locking-key retention means for retaining and initially driving said locking keys into said tapped bore and said finish-drive surface for providing a drive surface for simultaneously finish-driving said plurality of locking keys into said tapped bore so that an upper end of each of said locking keys is flush with an upper edge of said threaded insert.

2. The device of claim 1, wherein said locking-key retention means includes a plurality of key-retaining bores, said plurality corresponding in number to said plurality of tool keyways, each of said key-retaining bores having a bore diameter dimensioned to receive an upper end of a respective one of said locking keys.

3. The device of claim 2, wherein each bore of said plurality of key-retaining bores has a locking-key alignment contour adapted to urge said upper end of one of said locking keys into a proper alignment for installation.

4. The device of claim 1, wherein said locking-key retention means further includes a plurality of partial circular grooves provided in said insertion face concentric to said pilot, each partial circular groove of said plurality of grooves opening from said tool keyway, and wherein, by rotating said body, said locking key is receivable from said tool keyway into said locking-key drive means.

5. The device of claim 1 further comprising a timing mark provided on said outer perimeter of said insertion end, wherein, when said timing mark is aligned with any one of said locking keys, said finish-drive surface is above each of said locking keys.

\* \* \* \* \*